(12) United States Patent
Kato et al.

(10) Patent No.: US 7,590,266 B2
(45) Date of Patent: Sep. 15, 2009

(54) IMAGE PROCESSING APPARATUS

(75) Inventors: Noriji Kato, Kanagawa (JP); Motofumi Fukui, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 795 days.

(21) Appl. No.: 10/930,908

(22) Filed: Sep. 1, 2004

(65) Prior Publication Data

US 2005/0180610 A1 Aug. 18, 2005

(30) Foreign Application Priority Data

Feb. 18, 2004 (JP) ............................. 2004-041918

(51) Int. Cl.
*G06K 9/00* (2006.01)
*G06K 9/62* (2006.01)

(52) U.S. Cl. ...................... 382/118; 382/115; 382/117; 382/160; 382/215; 382/225

(58) Field of Classification Search ................. 382/115, 382/117, 118, 160, 215, 225
See application file for complete search history.

(56) References Cited

U.S. PATENT DOCUMENTS

| 5,828,769 | A | * | 10/1998 | Burns | 382/118 |
| 6,038,333 | A | * | 3/2000 | Wang | 382/118 |
| 6,445,810 | B2 | * | 9/2002 | Darrell et al. | 382/115 |
| 7,054,468 | B2 | * | 5/2006 | Yang | 382/118 |
| 7,239,929 | B2 | * | 7/2007 | Ulrich et al. | 700/98 |
| 2005/0074148 | A1 | * | 4/2005 | Rodyushkin et al. | 382/118 |
| 2005/0201595 | A1 | * | 9/2005 | Kamei | 382/118 |

FOREIGN PATENT DOCUMENTS

| JP | A 2-311962 | 12/1990 |
| JP | A 2003-281541 | 10/2003 |

OTHER PUBLICATIONS

Duda, et al. Pattern Classification. 2nd ed. Wiley Interscience, 2001. pp. 518, 519, 534, 535.*
Wiskott et al., "Face Recognition by Elastic Bunch Graph Matching," Intelligent Biometric Techniques in Fingerprint and Face Recognition, eds. L.C. Jain et al., publ. CRC Press, ISBN 0-8493-2055-0, Chapter 11, pp. 355-396, 1999.
Turk et al., "Eigenfaces for Recognition," Massachusetts Institute of Technology, Journal of Cognitive Neuroscience, vol. 3, No. 1, pp. 71-86, 1991.

* cited by examiner

*Primary Examiner*—Matthew C Bella
*Assistant Examiner*—Michael A Newman
(74) *Attorney, Agent, or Firm*—Oliff & Berridge, PLC

(57) ABSTRACT

An image processing apparatus is provided that is capable of executing identification of an object by using a two-dimensional-image having a relatively low resolution. In the image processing apparatus, image data obtained by photo capturing a prescribed object is used as a processing target; with respect to at least one plane relating to a part of the object, an N-dimensional estimated feature value (N $\geq$ 3) defining the plane is operated; the N-dimensional estimated feature value and information identifying the original object are associated with each other and stored as a recognition database in a storage unit; and the recognition database is applied to a recognition process of the object.

13 Claims, 4 Drawing Sheets

FIG. 1
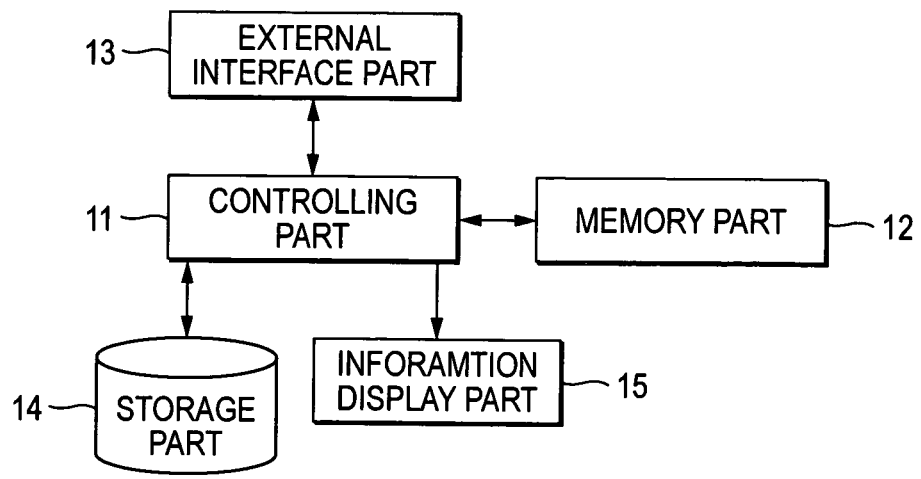
FIG. 2A
FIG. 2B
FIG. 2C
FIG. 3
| OBJECT IDENTIFYING INFORMATION | THREE-DEMENSIONAL ESTIMATED FEATURE VALUE |
|---|---|
| a a a a | $(\xi_j, \mu_j, \Sigma_j)_1, \ldots (\xi_k, \mu_k, \Sigma_k)_n$ |
| ⋮ | ⋮ |
| | |

IMAGE PROCESSING APPARATUS

BACKGROUND OF THE INVENTION

1. Field of the Invention

The present invention relates to an image processing apparatus for recognizing a prescribed object, such as a face of a person.

2. Description of the Related Art

In recent years, there is increasing necessity of security technology and processing of a large value of image information, and various kinds of techniques have been developed for identifying an individual person from an image of a face contained in image data imaged with a video camera or the like. Such a method has been known as a technique for identifying an individual person from a face image that characteristic points are extracted from a face image, and the characteristic points is verified with registered templates (as described in "Face Recognition by Elastic Bunch Graph Matching", written by Laurenz Wiskott, Jean-Marc Fellous, Norbert Krouger and Christoph von der Malsburg, Proc. 7th Intern. Conf. on Computer Analysis of Image and Patterns 1997). Another method has also been known that pattern information representing a face is mapped to a space defined to enhance personal differences (as described in "Eigenfaces for Recognition", written by Matthew A. Turk and Alex P. Pentland, Journal of Cognitive Neuroscience, vol. 3, No. 1, pp. 71-86, 1991).

SUMMARY OF THE INVENTION

The aforementioned conventional techniques for personal recognition are based on shapes and alignments of the characteristic parts, such as eyes, a nose and a mouth, and therefore, the image data necessarily has such a resolution that clarifies the shapes and alignments of them. Specifically, it is considered that the resolution is necessarily at least 100 pixels square. However, a face image cannot be always obtained to have such a high resolution.

JP-A-H02-311962 discloses a technique for identifying an individual person by comprehending differences in three-dimensional shapes of faces as personal differences, but not the aforementioned shapes and alignments of the characteristic parts. In order to utilize the technique, however, it is necessary to obtain three-dimensional information of a face, and therefore, it cannot be always applied to practical use.

The invention has been made in view of the aforementioned circumstances and is to provide an image processing apparatus capable of identifying an object by using a two-dimensional-image having a relatively low resolution.

According to one aspect of the invention, there is provided an image processing apparatus including: a calculating unit; and a storage unit, wherein the calculating unit converts pixels of two-dimensional-image data being obtained by photo capturing an object into an N-dimensional converted value and calculates N dimensional estimated feature values which are parameters for expressing the N-dimensional converted value with plural N-dimensional regions as bases, wherein the N is an integer larger than 2, the storage unit stores the N-dimensional estimated feature values and information, which indicates the object and is associated with the N-dimensional estimated feature values, and the calculating unit executes a recognition process with the recognition database.

According to another aspect of the invention, there is provided an image processing apparatus including: a calculating unit that is configured to be accessible to a recognition database; and an output unit, wherein the recognition database holds a prepared object identifying information for identifying each prepared object and N-dimensional estimated feature values each of the prepared object, wherein N dimensional estimated feature values are parameters for expressing an N-dimensional converted value with plural N-dimensional regions as bases, the N-dimensional converted value is a value converted pixels of two-dimensional-image data of the prepared object and the N is an integer larger than 2, the calculating unit converts pixels of two-dimensional-image data being obtained by photo capturing an aimed object for a reorganization into an N-dimensional converted value and calculates N dimensional estimated feature values, wherein N dimensional estimated feature values are parameters for expressing an N-dimensional converted value with plural N-dimensional regions as bases, the N-dimensional converted value is a value converted pixels of two-dimensional-image data of the aimed object, the calculating unit compares the N-dimensional estimated feature values of the aimed object with the N-dimensional estimated feature values of the prepared objects and the output unit outputs a result of the comparison.

It is possible that the calculating unit modifies the N-dimensional estimated feature values of prepared objects based on a photo captured state of the aimed objects. It can be controlled the result of the comparison based on an amount of the modification. It is also possible that the N-dimensional estimated feature value is a value that relates to a distribution which is a part of a mixed distribution, each distribution represents for each region.

According to still another aspect of the invention, there is provided a method of image processing, including: (a) loading two-dimensional-image data obtained by photo capturing a object; (b) converting multidimensional variables each including a positional coordinate value of each pixel and a pixel value, the pixels being contained in the two-dimensional-image data; (c) calculating likelihood of the plurality of the multidimensional variables, which are formed for each pixel, the likelihood being used when the multidimensional variables are described as mixed distributions; and (d) executing a recognition process with the likelihood.

It is possible that the mixed distributions have probability distributions, each having a single peak, as elemental distributions, and the likelihood is calculated except for a case where a distance between a position of the peak and the positional coordinate value of the pixel exceeds a predetermined threshold value.

Furthermore, it is possible that the mixed distributions have probability distributions each having a single peak, as elemental distributions. It is also possible that the mixed distributions are mixed Gaussian distributions.

According to yet still another aspect of the invention, there is provided a method for producing a recognition database, including: (a) loading two-dimensional-image data including a plurality of regions; the two-dimensional-image data being obtained by photo capturing an object, (b) converting pixels of two-dimensional-image data being obtained by photo capturing an object into an N-dimensional converted value, (C) calculating N dimensional estimated feature values which are parameters for expressing the N-dimensional converted value with plural N-dimensional regions as bases, wherein the N is an integer larger than 2; and (d) storing the N-dimensional estimated feature values and information indicating the object as a recognition database.

According to a further aspect of the invention, there is provided a method of image processing executable by a computer, wherein the computer is configured to be accessible to a recognition database that holds a prepared object identifying information for identifying each prepared object and N-dimensional estimated feature values each of the prepared object, wherein N dimensional estimated feature values are parameters for expressing an N-dimensional converted value with plural N-dimensional regions as bases, the N-dimensional converted value is a value converted pixels of two-dimensional-image data of the prepared object and the N is an integer larger than 2, the program making the computer execute procedures including: (a) loading two-dimensional-image data being obtained by photo capturing an aimed object, (b) converting pixels of two-dimensional-image data being obtained by photo capturing an object into an N-dimensional converted value; (C) calculating N dimensional estimated feature values which are parameters for expressing the N-dimensional converted value with plural N-dimensional regions as bases, (d) comparing the N-dimensional estimated feature values of the aimed object with the N-dimensional estimated feature values of the prepared objects to identify the aimed object; and (e) outputting a result of the comparison.

According to a still further aspect of the invention, there is provided a program executable by a computer, wherein the computer is configured to be accessible to a recognition database that holds a prepared object identifying information for identifying each prepared object and N-dimensional estimated feature values each of the prepared object, wherein N dimensional estimated feature values are parameters for expressing an N-dimensional converted value with plural N-dimensional regions as bases, the N-dimensional converted value is a value converted pixels of two-dimensional-image data of the prepared object and the N is an integer larger than 2; the program making the computer execute procedures comprising:(a) loading a two-dimensional-image data including an aimed object; the two-dimensional-image data being obtained by photo capturing an aimed object, (b) converting pixels of two-dimensional-image data being obtained by photo capturing an object into an N-dimensional converted value, (C) calculating N dimensional estimated feature values which are parameters for expressing the N-dimensional converted value with plural N-dimensional regions as bases, (d) comparing the N-dimensional estimated feature values of the aimed object with the N-dimensional estimated feature values of the prepared objects to identify the aimed object; and (e) outputting a result of the comparison.

According to a still further aspect of the invention, there is provided a program executable by a computer, making the computer execute procedures including: (a) loading two-dimensional-image data obtained by photo capturing an object; (b) forming multidimensional variables each including a positional coordinate value of each pixel and a pixel value, the pixels being contained in the two-dimensional-image data; and (c) calculating likelihood of the plurality of the multidimensional variables, which are formed for each pixel, the likelihood being used when the multidimensional variables are described as mixed distributions.

BRIEF DESCRIPTION OF THE DRAWING

These and other objects and advantages of this invention will become more fully apparent from the following detailed description taken with the accompanying drawings in which:

FIG. 1 is a block diagram showing a constitution of an image processing apparatus according an embodiment of the invention;

FIGS. 2A to 2C are explanatory diagrams showing summary of image processing according to an embodiment of the invention;

FIG. 3 is an explanatory diagram showing an example of contents of a recognition database;

DETAILED DESCRIPTION OF THE PREFERRED EMBODIMENTS

Figure 4:
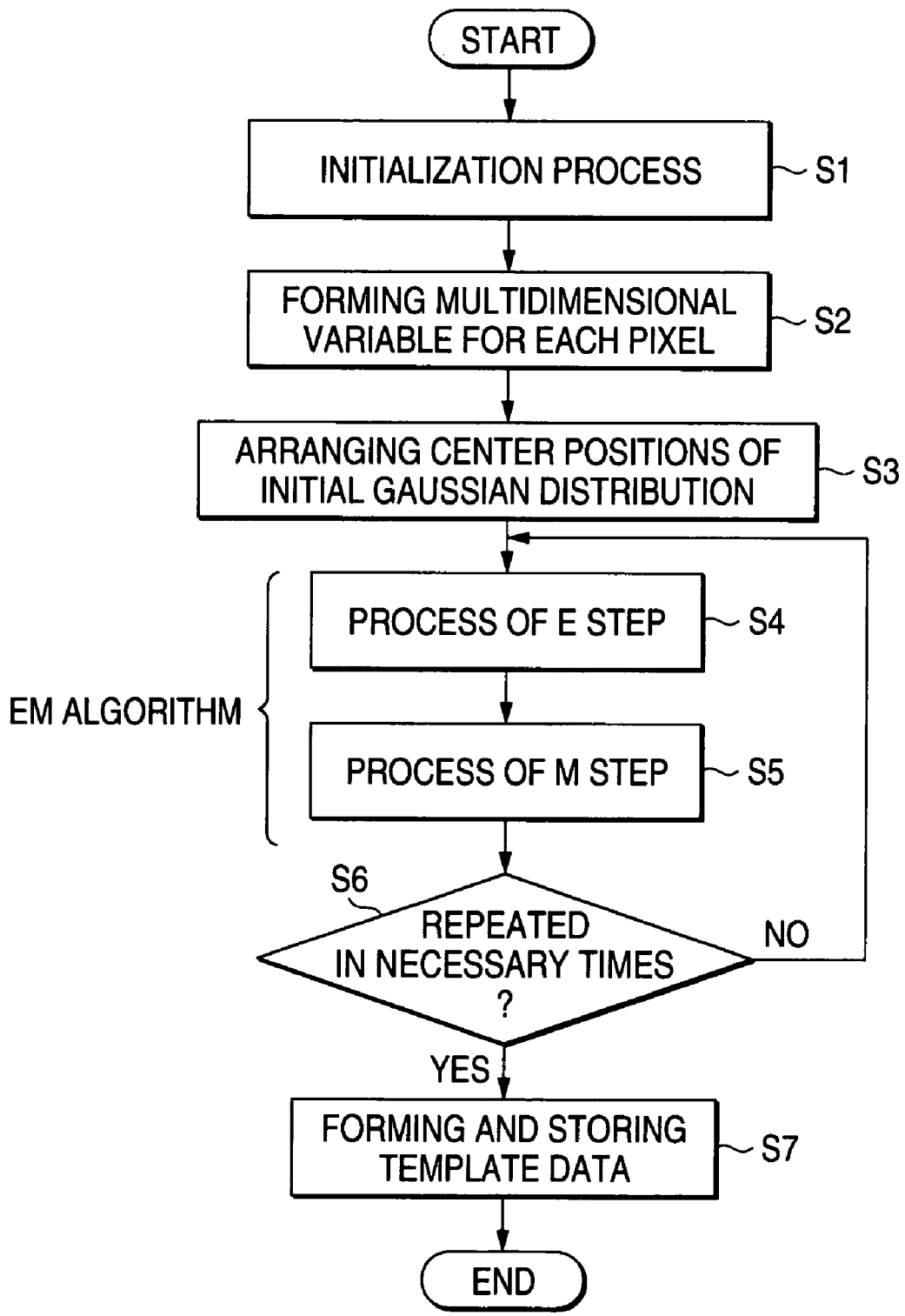
FIG. 4 is a flow chart showing an example of a formation process of a recognition database.

An embodiment of the invention will be described with reference to the drawings. An image forming apparatus according to an embodiment of the invention is constituted from a controlling part 11, a memory part 12, an external interface part 13, a storage part 14 and an information display part 15, as shown in FIG. 1. The controlling part 11 is operated according to a program stored in the memory part 12. The controlling part 11 executes a formation process of a recognition database, and a process for identifying an object by using the recognition database thus formed. In the following description, it is assumed for simplicity that the object is a face of a person, and information identifying an individual person is output as a result of recognition. The substance of the process executed by the controlling part 11 will be described in detail later.

The memory part 12 stores a program executed by the controlling part 11. The memory part 12 also functions as working memory for storing various kinds of data formed during operation of the process by the controlling part 11. The external interface part 13 receives image data (two-dimensional-image data containing pixels two-dimensionally aligned) as a target of the process from an external apparatus and outputs it to the controlling part 11. The storage part 14 stores a recognition database formed by the controlling part 11. The information display part 15 is, for example, a display device, for outputting a result of recognition process by the controlling part 11.

The substance of the process executed by the controlling part 11 will be specifically described. In this embodiment, three-dimensional estimated feature values are used as information, on which the recognition is based, and thus, the three-dimensional estimated feature values are also operated upon forming a recognition database and upon comparing with a template recorded in the recognition database. Accordingly, the substance of the process of operating the three-dimensional estimated feature value will be firstly described.

[Operation of Three-dimensional Estimated Feature Value]

In this embodiment, three-dimensional estimated feature values are operated from one piece of two-dimensional-image data input from the external interface part 13. Accordingly, operation is executed in such a manner that the object is expressed as a group of plural regions, to which the object is coordinated, respectively, so as to determine three-dimensional estimated feature values corresponding to each of the regions. While the regions can be expressed by using functions, the operation can be easily executed by describing with a combination of a prescribed elemental distribution and parameter. Specifically, the controlling part 11 forms a three-dimensional variable having a combination of a position of a pixel and an value relating to a pixel value thereof for each of pixels constituting the object, and parameters of prescribed mixed distributions that maximize likelihood upon describing a group of three-dimensional variable formed for each of the pixels as prescribed mixed distributions having a prescribed number of parameters are operated as the three-dimensional estimated feature values. As the technique for finding the position of the object in image data, those disclosed by JP-A-2003-281541 can be used.

The controlling part 11 forms a three-dimensional variable x=(a, b, I (a, b)) for a rectangular region (face image data) of an object (face) by using a positional coordinate value (a, b) of a pixel in the rectangular region and a luminance value I (a, b) of the pixel. The positional coordinate value can be defined as the left bottom of the rectangular region as (0, 0).

A probability that a three-dimensional variable thus formed for each of the pixels is described by using a mixed distribution of m pieces of elemental distributions as bases is expressed by the following equations (1) and (2).

$$p(x; \theta) = \sum_{j=1}^{m} \xi_j p(x; \theta_j) \quad (1)$$

$$p(x, \theta_j) = \frac{1}{(2\pi)^{d/2}} \exp\left[-\frac{1}{2}(x - \mu_j)^T \sum_{j}^{-i} (x - \mu_j)\right] \quad (2)$$

Wherein $\xi_j$ represents a mixed parameter of the j-th elemental distribution, and $\theta_j$ represents a parameter of the j-th elemental distribution. The elemental distribution is preferably a probability distribution having a single peak, and specifically may be a Gaussian distribution. $\mu_j$ represents a center of the peak of the j-th elemental distribution, i.e., the center of the distribution, and $\Sigma_j$ represents a covariance matrix. d represents a dimensional number, which is 3 in this embodiment. It is assumed in the following description that the elemental distribution as bases is a Gaussian distribution, and therefore, the mixed distribution is a mixed Gaussian distribution.

Accordingly, parameters of the mixed distribution relating to the sample are the mixed parameter $\xi_j$, the center of the Gaussian distribution $\mu_j$, and the covariance matrix $\Sigma_j$, and the parameters are handled as three-dimensional estimated feature values. The parameters corresponding to prescribed face image data can be defined by the well-known EM algorithm.

In the case where a Gaussian distribution is employed, the mixed parameter $\xi_j$ is a value meaning a weight of the j-th Gaussian distribution, and the covariance matrix $\Sigma_j$ is a value meaning the peak direction of the j-th Gaussian distribution. Therefore, by obtaining the three parameters for each of m pieces of elemental distributions, the object is expressed as a group of m pieces of regions.

The initial value of each of the elemental distributions constituting the mixed distribution can be arbitrarily set but is not limited to a Gaussian distribution. For example, it is possible that equally spaced lattices are set for a rectangular image, and centers of the lattices are designated as initial positions of the elemental distributions, or in alternative, plural elemental distributions are densely arranged adjacently to each other in an area, in which it is expected that the structure of the object becomes complex, such as the vicinity of the center of the image. In the former case where the initial positions of the elemental distributions are arranged with equal spaces or arranged regularly, such an advantage is obtained that various objects can be handled, but there is a disadvantage that such elemental distributions are liable to occur that have mixed parameter $\xi_j$ of substantially zero in the periphery of the image, so as to decrease the number of the feature values that can be substantially used for recognition. In the case where the initial positions of the elemental distributions are irregularly arranged, the advantage and the disadvantage are generally counterchanged, but since the image thus input is generally constituted from equally spaced pixels, there is such disadvantage that the size (area) of the regions partitioned by the elemental distributions becomes small in the area where the initial values of the elemental distributions are densely arranged, and the number of pixels contained therein is decreased to lower the accuracy of the distribution. It is preferred therefore that the initial positions of the elemental distributions and the number of the elemental distributions m are determined in such a manner that at least 10 pixels are contained in one area corresponding to each of the regions of the elemental distributions. The number of the elemental distributions m is preferably 30 or more because too complex characteristics cannot be expressed in the case where it is too small. There is no particular upper limit thereof unless the aforementioned number of pixels contained in each of the regions is not ensured.

Specifically, a probability that the sample conforms to the J-th Gaussian distribution is obtained as in the following equation (3)

$$q^{(i)}(J \mid x) = \frac{\xi_j p(x; \theta_j^{(i)})}{\sum_{j=1}^{m} \xi_j p(x; \theta_j^{(i)})} \quad (3)$$

and a logarithmic likelihood of the complete data is calculated as in the following equation (4) (this process is referred to as the E step).

$$Q(\theta) = \sum_{i=1}^{n} \sum_{j=1}^{m} q^{(i)}(j \mid x_i) \log\{\xi_j p(x_i; \theta_j)\} \quad (4)$$

Subsequently, the parameters of the mixed distribution that maximizes the logarithmic likelihood Q are determined as in the following equations (5), (6) and (7) (this process is referred to as the M step).

$$\xi_J^{(t+1)} = \frac{1}{n} \sum_{i=1}^{n} q^{(t)}(J \mid x_i) \quad (5)$$

$$\mu_J^{(t+1)} = \frac{1}{n \xi_J^{(t+1)}} \sum_{i=1}^{n} q^{(t)}(J \mid x_i) x_i \quad (6)$$

$$\Sigma_J^{(t+1)} = \frac{1}{n \xi_J^{(t+1)}} \sum_{i=1}^{n} q^{(t)}(J \mid x_i)(x_i - \mu_J^{(t+1)})(x_i - \mu_J^{(t+1)})^T \quad (7)$$

The parameters that maximize the logarithmic likelihood Q can be obtained by repeating the operation in prescribed times. The controlling part 11 thus outputs the parameters corresponding to the face image data processed, as three-dimensional estimated feature values.

Specifically, for example, the Gaussian distributions found by the parameters defined by the EM algorithm in the original image shown in FIG. 2A is shown in FIG. 2B. The ellipses in FIG. 2B correspond to the Gaussian distributions, respectively. An image that results in the highest likelihood with the Gaussian distributions shown in FIG. 2B is schematically shown in FIG. 2C. In the practical operation, plural mixed distributions having prescribed values or random values as the parameters are used as the initial state, and the parameters relating to the elemental distributions (Gaussian distributions) of each of the mixed distributions are adjusted according to the EM algorithm.

It is also possible that the regions expressing the object are substituted by planes arranged three-dimensionally. For example, in the case where the elemental distributions are Gaussian distributions, the parameters relating to the Gaussian distributions are sort of values that define plural planes approximately expressing the face as the object. In the case where the face as the object is approximately expressed by plural planes, it is also possible that four-dimensional or higher dimensional values are formed for each of the planes, and the high dimensional values are used.

[Formation Process of Recognition Database]

The controlling part 11 forms the aforementioned three-dimensional estimated feature values for each of the prepared objects to be applied to be verified, and the three-dimensional estimated feature values thus formed and object identifying information (for example, the name of the person) are associated with each other and stored as a recognition database in the storage part 14 (FIG. 3).

Specifically, as shown in FIG. 4, an initialization process is applied to an image of an object to be verified (S1). In the initialization process, the image data of the object is scaled to a prescribed size (for example, 64×100 pixels), and the image data after scaling is smoothed by applying a Gaussian filter and then subjected to histogram equalization. The histogram equalization referred herein is a conversion process for redistributing pixel values in such a manner that the frequency values of the pixel values are substantially equal to each other within the codomain of each of the pixel values. It has been known that contrast of the image is elucidated as a result of the conversion process.

The controlling part 11 then converts the pixel values of the image data having been subjected to the initialization process to a multidimensional variable having a combination of the positional coordinate value and the luminance value thereof (S2). The controlling part 11 then arranges plural center positions of initial Gaussian distributions (for example, 7×7=49) uniformly in the image data of the object (S3). The controlling part 11 executes the process of the E step with the center positions of the initial Gaussian distributions as starting points (S4), and then executes the process of the M step (S5). The controlling part 11 then investigates as to whether or not the steps S4 and S5 are repeated in necessary times (S6), and in the case where they are repeated in necessary times, the controlling part 11 forms template data containing the parameter operated in the last S5 step and information identifying the object to be verified (which is used as a base of the parameter operation) associated with each other, and then stores the template data in the storage part 4 (S7), so as to complete the process. A group of the template data constitutes the recognition database.

[Recognition Process]

Figure 5:
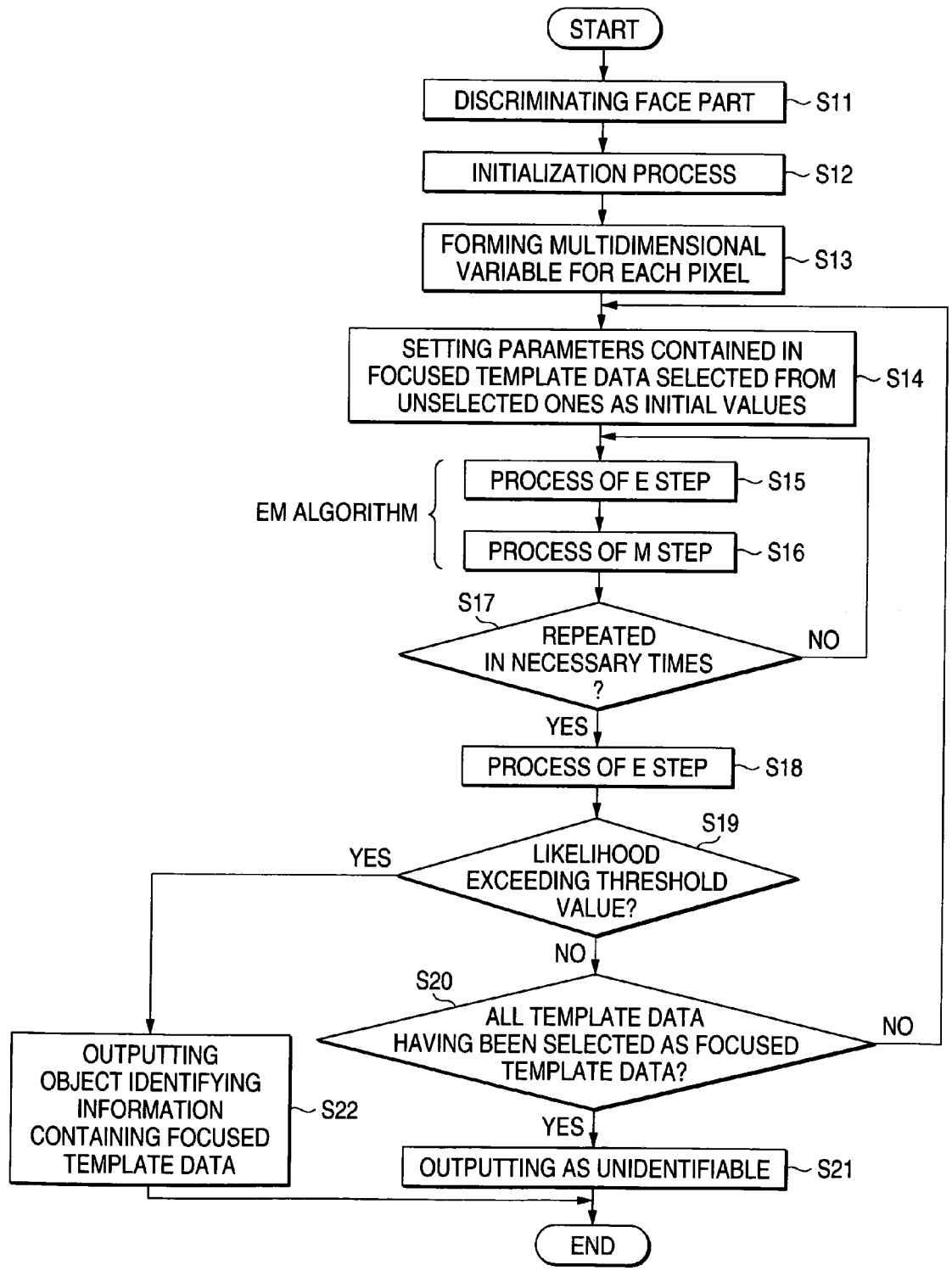
FIG. 5 is a flow chart showing an example of a recognition process.

The recognition process by the controlling part 11 will be described. The controlling part 11 marks as unselected the respective template data in the recognition database stored in the storage part 14, and starts the process shown in FIG. 5. The controlling part 11 processes image data, which includes aimed object for the recognition, input through the external interface part 13, and discriminates a face part therefrom (S11). The discrimination can be carried out, for example, by the method disclosed in JP-A-2003-281541. The partial image data of the face part thus discriminated is then subjected to an initialization process (S12). The initialization process herein is the same as that in the formation of the recognition database, in which the partial image data of the face part is scaled to a prescribed size (for example, 64×100 pixels), and the image data after scaling is smoothed by applying a Gaussian filter and then subjected to histogram equalization.

The controlling part 11 then converts the pixel values of the image data having been subjected to the initialization process to a multidimensional variable having a combination of the positional coordinate value and the luminance value thereof (S13). One piece of the template data that is marked as unselected in the recognition database stored in the storage part 14 is then selected as focused template data (which may be marked as selected in this step), and the parameters contained in the focused template data are set as initial values (S14).

The controlling part 11 executes the process of the E step with the initial values as starting points (S15), and then executes the process of the M step (S16). The controlling part 11 then investigates as to whether or not the steps S15 and S16 are repeated in necessary times (S17), and in the case where they are not repeated in necessary times, the process is returned to the step S15 for continuation of the process. According to the process, the template is automatically modified. After repeating the steps in necessary times, the E step is further executed (S18). The repetition number in the step S17 may be zero (i.e., the processes of the E step and the M step are not executed), and in this case, the processes of the steps S15, S16 and S17 are not always necessary.

The controlling part 11 investigates as to whether or not the logarithmic likelihood obtained as a result of the process of S18 exceeds a prescribed threshold value (S19). In the case where the logarithmic likelihood does not exceed the prescribed threshold value, the controlling part 11 investigates as to whether or not all the pieces of the template data are marked as selected (S20), and in the case where they are marked as selected, the controlling part 11 decides as unidentifiable and outputs accordingly to the information display part 15 (S21) to complete the process.

In the case where all the pieces of the template data are not marked as selected with unselected remaining in the step S20, the process is returned to the step S14 for continuation of the process.

In the case where the logarithmic likelihood obtained as a result of the process of S18 exceeds the prescribed threshold value in the step S19, the controlling part 11 outputs at this time the object identifying information contained in the focused template data to the information display part 15 (S22). After executing the process of the step S22, the controlling part 11 may complete the process, or in alternative, it may return to the step S20 to continue the process, and may display a list of the object identifying information with the template data having logarithmic likelihoods exceeding the prescribed threshold value. In this case, the list of the object identifying information may be displayed after being sorted by the logarithmic likelihood in descending order.

[Modification of Template]

In the recognition process, the controlling part 11 may further acquire the template data and information relating to the discriminated face part (information relating to direction, position, size and expression of the face, the imaging condition of the object as the base of the template data, and the imaging condition of the object as the processing target), and based on the information, the controlling part 11 may move the center positions of the Gaussian distributions contained in the template data. For example, in the case where the center position of the face part thus discriminated from the input image data as the processing target is deviated from the center position of the face part of the template data by a deviation length ($\Delta x$, $\Delta y$) in the coordinate, the center positions of the Gaussian distributions are moved by the deviation length in coordinate. With respect to the expression of the face part, there are differences in positions of cheeks between impassivity and smile, and the center positions of the Gaussian distributions positioned at the cheeks in the template data are moved by prescribed amounts.

The information relating to direction, position and size of the face may be acquired by the process disclosed in JP-A-2003-281541, or may be input by an operator from an operating part, which is not shown in the figures.

One of the characteristic features of this embodiment is that upon applying the aforementioned modification to the template data, the likelihood as a result of the comparison is controlled based on the amount of the modification. Specifically, in the case where the center positions of the Gaussian distributions are moved from $\mu_{oj}$ to $\mu_j$, the logarithmic likelihood is defined by the following equation (8) in place of the equation (4).

$$Q(\theta) = \sum_{i=1}^{n}\sum_{j=1}^{m} q^{(t)}(j|x_i)\log\{\xi_j p(x_i;\theta_j)\} + \eta \sum_{i=1}^{n}\sum_{j=1}^{m} q^{(t)}(j|x_i)(\mu_j - \mu_{0j}) \quad (8)$$

The equation (8) includes the additional term (the second term of the right side member, which is referred to as a penalty term, hereinafter) in comparison to the equation (4). In the equation (8), $\eta$ represents a coefficient indicating the strength of the penalty term and can be experimentally determined.

In this case, the parameter of the center position of the distribution in the process of the M step is obtained by the following equation (9).

$$\mu_j^{(t+1)} = (1 + 2\eta\Sigma_J)^{-1}\left\{\frac{1}{n\xi_J^{(t+1)}}\sum_{i=1}^{n} q^{(i)}(J|x_i)x_i + 2\eta\Sigma_J\mu_{ol}\right\} \quad (9)$$

The center positions of the Gaussian distributions are moved in the M step, but the moving amounts thereof are restricted by the penalty term.

The process in the steps S15 to S17 may also be executed after defining the logarithmic likelihood by adding the penalty term, and thereby the modification of the template, which is automatically effected, can be restricted.

[Another Example of Template Data]

The recognition database may contain plural pieces of template data relating to the same object identifying information. Specifically, plural pieces of template data are formed for the face of the same person with difference in direction and size of the face, and the plural pieces of the template data are associated to the object identifying information. In this case, information relating to the direction and the size of the face of the object may be associated to the template data and contained in the recognition database.

[Speeding-up of Calculation]

In this embodiment described hereinabove, occurrence probabilities from all the Gaussian distributions (in all the Gaussian distributions, probabilities of being capable of describing with the Gaussian distributions) in the calculation of the logarithmic likelihood is operated for each of the pixels, but in the part with a distance from the focused pixel exceeding a prescribed threshold value, the probability may be designated as zero to omit the operation. The threshold value for the distance may be a value 1.2 times the covariance of the Gaussian distribution. According to the procedure, the calculated amount can be reduced to relieve the processing load.

[Operation]

The operation of the image processing apparatus according to this embodiment will be described. In the image processing apparatus according to this embodiment, three-dimensional estimated feature values are previously operated for face images of persons to be verified, and the three-dimensional estimated feature values are associated with the information identifying the persons and stored as a recognition database in the storage part 14.

In plural piece of image data, for example, successively obtained by video imaging, a face part is discriminated, and the object identifying information corresponding to the face part is acquired by utilizing the three-dimensional estimated feature values contained in the recognition database.

[Combination with Conventional Technique]

Furthermore, the image processing apparatus according to this embodiment may be applied to such a process that the conventional two-dimensional pattern matching process is executed in parallel to the process using the three-dimensional estimated feature values, and a final processing result may be obtained based on results of both the processes. In this case, the list of the combinations of the recognition result and the similarity (likelihood) obtained by the process using the three-dimensional estimated feature values and the list of the combinations of the recognition result and the similarity obtained by the conventional process are synthesized. In other words, it is possible that the results of similarity from the respective processes are summed with weight for each of the recognition results (object identifying information) to calculate a point, and the recognition results (object identifying information) are output after sorting in descending order of the point.

EXAMPLE

A recognition database having faces of 1,096 persons registered therein is formed by using the aforementioned three-dimensional estimated feature values, and the recognition process is executed with varying the number of pixels of the face part. The results are shown in FIG. 6.

Figure 6:
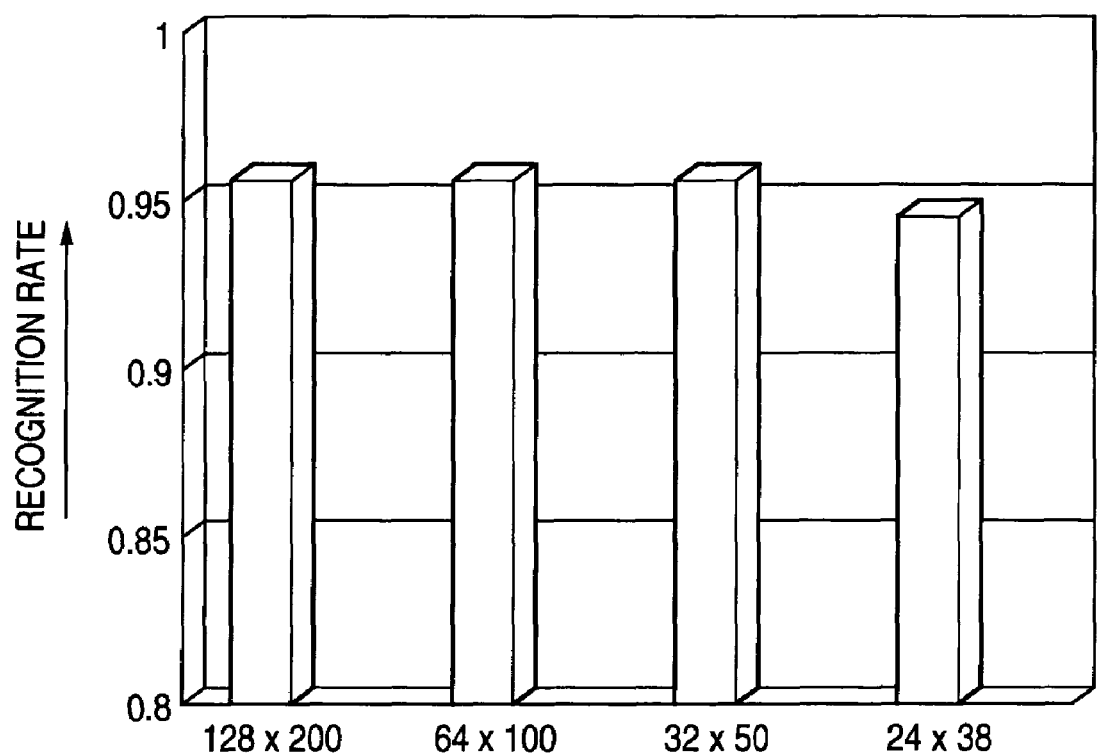
FIG. 6 is a graph showing an example of experimental results of a recognition process.

It is understood from the results shown in FIG. 6 that a recognition rate of 95% or higher is attained with a number of pixels exceeding 100 pixels square (128×200 and 64×100), and a recognition rate equivalent to 95% is attained even in the cases of a number of pixels of less than 100 pixels square (32×50 and 24×38). As having been described, according to this embodiment, an object can be identified even by using a two-dimensional-image having a relatively low resolution.

The foregoing description of the preferred embodiments of the invention has been presented for purposes of illustration and description. It is not intended to be exhaustive or to limit the invention to the precise form disclosed, and modifications and variations are possible in light of the above teachings or maybe acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus comprising:

means for photo-capturing objects;

a calculating unit; and a storage unit including a recognition database, wherein the calculating unit converts pixels of single two-dimensional-image data showing each object into an N-dimensional converted values and calculates N-dimensional estimated feature values which are parameters for expressing a group of the N-dimensional converted values by the following expression, $$\sum_{j=1}^{m} \xi_j p(x; \theta_j) \quad (1)$$

where:

x denotes the N-dimensional converted value;

$\xi_j$ and $\theta_j$ are included in the N-dimensional estimated feature values;

$p(x; \theta_j)$ represents an element distribution;

N is an integer larger than 2; and m is a natural number, wherein the calculated N-dimensional estimated feature values for each object maximizes a likelihood that the group of N-dimensional converted values for each object is expressed by the expression (1), the storage unit stores in the recognition database N-dimensional estimated feature values for each object and object identifying information, which indicates each object, in association with each other, the calculating unit executes a recognition process that compares N-dimensional estimated feature values for an aimed object with the N-dimensional estimated feature values for the objects stored in the recognition database, each N-dimensional converted value includes a position coordinate value of the corresponding pixel and a pixel value of the corresponding pixel.

2. An image processing apparatus comprising:

a calculating unit that is configured to be accessible to a storage unit including a recognition database holding a plurality of prepared objects; and an output unit, wherein the recognition database stores object identifying information for identifying each prepared object and N-dimensional estimated feature values for each prepared object in association with each other, wherein the N-dimensional estimated feature values for each prepared object are parameters for expressing a group of N-dimensional converted value for each prepared object by the following expression, $$\sum_{j=1}^{m} \xi_j p(x; \theta_j) \quad (1)$$

where:

x denotes the N-dimensional converted value;

$\xi_j$ and $\theta_j$ are included in the N-dimensional estimated feature values;

$p(x; \theta_j)$ represents an element distribution;

N is an integer larger than 2; and

M is a natural number, wherein the N-dimensional converted values for each prepared object include position coordinate values of pixels of single two-dimensional-image data showing each prepared object, the calculating unit converts pixels of single two-dimensional-image data showing an aimed object for a reorganization into N-dimensional converted values including position coordinate values of pixels of the single two-dimensional-image data showing the aimed object and pixel values of the pixels of the single two-dimensional-image data showing the aimed object, the calculating unit calculates N-dimensional estimated feature values which are parameters for expressing a group of the N-dimensional converted values for the aimed object by the expression (1), the calculating unit compares the N-dimensional estimated feature values for the aimed object with the N-dimensional estimated feature values for the prepared objects stored in the recognition database, and the output unit outputs a result of the comparison.

3. The image processing apparatus according to claim 2, wherein the single two-dimensional-image data showing the aimed object is obtained by photo capturing the aimed object, and the calculating unit modifies the N-dimensional estimated feature values for the prepared objects based on a photo captured state of the aimed object.

4. A method of image processing comprising:

using a computer to perform the steps of:

(a) loading single two-dimensional-image data, each showing a prepared object;

(b) converting the two-dimensional-image data into multidimensional variables, each multidimensional variable comprising a positional coordinate value of a corresponding pixel of the two-dimensional-image data and a pixel value of the corresponding pixel of the two-dimensional-image data, the pixels being contained in the single two-dimensional-image data;

(c) calculating multidimensional estimated feature values that are parameters for expressing a group of the multidimensional variables by the following expression $$\sum_{j=1}^{m} \xi_j p(x; \theta_j) \quad (1)$$

where:

x denotes the multidimensional variable;

$\xi_j$ and $\theta_j$ are included in the multidimensional estimated feature values;

$p(x; \theta_j)$ represents an element distribution; and m is a natural number, wherein the calculated multidimensional estimated feature values maximize a likelihood that the group of multidimensional variables is expressed by the expression (1);

(d) executing a recognition process by comparing multidimensional estimated feature values for an aimed object with the multidimensional estimated feature values for the prepared objects stored in a recognition database.

5. The method of image processing according to claim 4, wherein each element distribution $p(x; \theta_j)$ is a probability distribution having a single peak, and the likelihood is calculated except for a case where a distance between a position of the peak and the positional coordinate value of the pixel exceeds a predetermined threshold value.

6. The image processing apparatus according to claim 1, wherein each element distribution $p(x; \theta_j)$ is a probability distribution having a single peak.

7. The image processing apparatus according to claim 2, wherein each element distribution $p(x; \theta_j)$ is a probability distribution having a single peak.

8. The image processing apparatus according to claim 1, wherein expression (1) is mixed Gaussian distributions.

9. The image processing apparatus according to claim 2, wherein the expression (1) is mixed Gaussian distributions.

10. The method of image processing according to claim 4, wherein the expression (1) is mixed Gaussian distributions.

11. A method for producing a recognition database, comprising:
   using a computer to perform the steps of:
   (a) loading single two-dimensional-image data including a plurality of regions, each showing a prepared object,
   (b) converting pixels of two-dimensional-image data into N-dimensional converted value, each N-dimensional converted value comprising a positional coordinate value of a corresponding pixel of the two-dimensional-image data and a pixel value of the corresponding pixel of the two-dimensional-image data,
   (c) calculating N-dimensional estimated feature values for each prepared object which are parameters for expressing a group of N-dimensional converted values for each prepared object by the following expression, $$\sum_{j=1}^{m} \xi_j p(x; \theta_j) \qquad (1)$$

where:
   x denotes the N-dimensional converted value;
   $\xi_j$ and $\theta_j$ are included in the N-dimensional estimated feature values;
   $p(x; \theta_j)$ represents an element distribution;
   N is an integer larger than 2; and
   m is a natural number,
wherein the calculated N-dimensional estimated feature values maximize a likelihood that the group of N-dimensional converted values is expressed by the expression (1), and
   (d) storing a plurality of different prepared objects in the recognition database, each prepared object including the N-dimensional estimated feature values and identifying information indicating each different prepared object in the recognition database.

12. A computer program executable by a computer program, the computer program comprising instructions that cause a computer to access a recognition database that holds a plurality of different prepared objects, each prepared object including object identifying information for identifying each prepared object and N-dimensional estimated feature values for each of the prepared object, wherein N-dimensional estimated feature values are parameters for expressing an N-dimensional converted value with plural N-dimensional regions as bases, the N-dimensional converted value is a value converted pixels of a single two-dimensional-image data of the prepared objects and the N is an integer larger than 2,
   the computer program further comprises instructions for:

(a) loading a single two-dimensional-image data including an aimed object; the single two-dimensional-image data being obtained by photo capturing an aimed object,
(b) converting pixels of the single two-dimensional-image data being obtained by photo capturing an object into N-dimensional converted values, each N-dimensional converted value comprising a positional coordinate value of a corresponding pixel of the two-dimensional-image data and a pixel value of the corresponding pixel of the two-dimensional-image data;
(c) calculating N-dimensional estimated feature values which are parameters for expressing a group of N-dimensional converted values with plural N-dimensional regions as bases, to form a prepared object by the following expression:

$$\sum_{j=1}^{m} \xi_j p(x; \theta_j) \qquad (1)$$

where:
   x denotes the N-dimensional converted value;
   $\xi_j$ and $\theta_j$ are included in the N-dimensional estimated feature values;
   $p(x; \theta_j)$ represents an element distribution;
   N is an integer larger than 2; and
   m is a natural number,
wherein the calculated N-dimensional estimated feature values maximize a likelihood that the group of N-dimensional converted values is expressed by the expression (1);
(d) comparing the N-dimensional estimated feature values of the aimed object with the N-dimensional estimated feature values of the prepared objects stored in the recognition database to identify the aimed object; and
(e) outputting a result of the comparison.

13. A computer readable medium encoded with a computer program, the computer program comprising instructions that cause a computer to:
(a) load single two-dimensional-image data, each showing a prepared object;
(b) forming multidimensional variables from the two-dimensional image data, each multidimensional variable comprising a positional coordinate value of a corresponding pixel of the two-dimensional-image data and a pixel value of the corresponding pixel of the two-dimensional-image data, the pixels being contained in the single two-dimensional-image data;
(c) calculate multidimensional estimated feature values that are parameters for expressing a group of the multidimensional variables by the following expression:

$$\sum_{j=1}^{m} \xi_j p(x; \theta_j) \qquad (1)$$

where:
   x denotes the N-dimensional converted value;
   $\xi_j$ and $\theta_j$ are included in the N-dimensional estimated feature values;

$p(x; \theta_j)$ represents an element distribution;

m is a natural number, wherein the calculated multidimensional estimated feature values maximize a likelihood that the group of multidimensional variables converted values is expressed by the expression (1), and (d) execute a recognition process by comparing multidimensional estimated feature values for an aimed object with the multidimensional estimated feature values for the prepared objects stored in a recognition database.

* * * * *